INVENTORS:
ROLF BRÜCK, WALTER HARZ
BY Burgess, Dinklage & Sprung
ATTORNEYS

April 4, 1961 W. HARZ ET AL 2,978,414

MAGNETIC IMPULSE RECORD CARRIER

Filed June 1, 1956 3 Sheets-Sheet 2

INVENTORS
ROLF BRÜCK, WALTER HARZ

BY Burgess, Dinklage & Sprung

ATTORNEYS

INVENTOR.
ROLF BRÜCK WALTER HARZ
BY Burgess, Dinklage & Sprung
ATTORNEYS 2,978,414

MAGNETIC IMPULSE RECORD CARRIER

Walter Harz, Hamburg, and Rolf Bruck, Leverkusen-Bayerwerk, Germany, assignors to Agfa Aktiengesellschaft, Leverkusen, Germany, a corporation of Germany Filed June 1, 1956, Ser. No. 588,708

Claims priority, application Germany Apr. 9, 1951

2 Claims. (Cl. 252—62.5)

Figure 1:
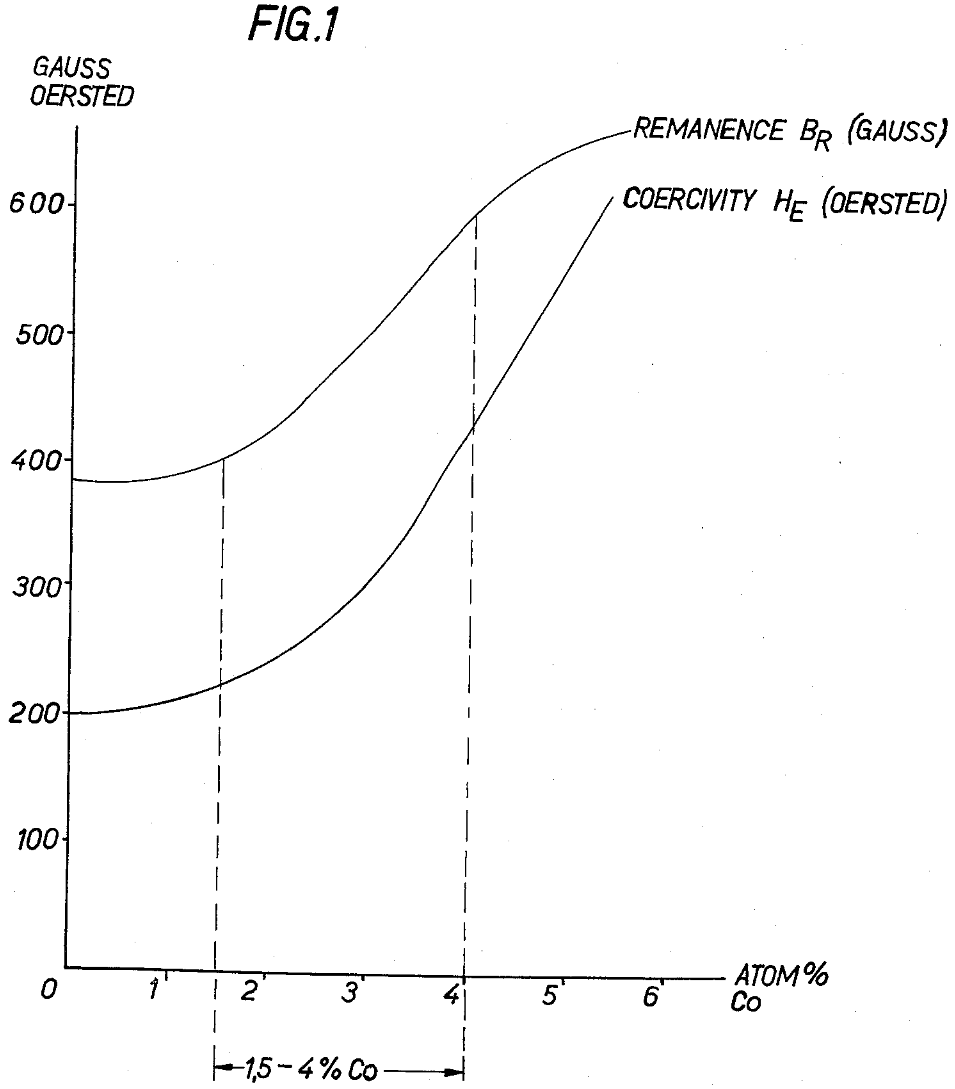

The present invention relates to new magnetic impulse record carriers and more especially to magnetic impulse record carriers the recording layer of which essentially consists of a non-magnetizable plastic binder in which is embedded a magnetic powder consisting of a ferromagnetic metal oxide the metals of which are iron and cobalt, the cobalt being present in smaller portions than iron.

The present application is a continuation-in-part of our prior applications Serial Nos. 280,181 and 280,182 both filed April 2, 1952, both now abandoned.

It is known to use magnetizable iron oxide for the production of magnetic impulse record carriers. These iron oxides are obtained by the following methods:

(*a*) Magnetic iron oxides such as $\alpha$-$Fe_2O_3$, $\alpha$-FeOOH or $\gamma$-FeOOH are reduced to magnetite ($FeO \cdot Fe_2O_3$) which, if necessary, is oxidized to the ferromagnetic $\gamma$-$Fe_2O_3$. These iron oxides have remanence values of 360–420 Gauss.

(*b*) A ferro-salt is dissolved in an aqueous solution and precipitated by means of alkali in the form of $Fe(OH)_2$ which is oxidized to $Fe_3O_4$. The latter, if necessary, is oxidized to $\gamma$-$Fe_2O_3$ after drying. The remanence values are 350–380 Gauss.

According to the present invention powdery ferromagnetic iron-cobalt oxides are used for the production of magnetic impulse record carriers, said oxides containing cobalt in a quantity amounting to 1.5 to 4 atomic percent as calculated on the total amount of metal atoms of said oxides. These oxides have remanence values of at least 400, lying in general in the region between about 400 and 650 Gauss, and coercivity values of about 220 to 420 Oersted.

These oxides are prepared by disolving a water soluble salt of iron and a water soluble salt of cobalt in an aqueous solution, co-precipitating from said solution hydroxides of said metals, treating said co-precipitated hydroxides in an aqueous medium with an alkaline agent, preferably in the presence of an oxidizing agent, whereby said hydroxides are transformed into ferromagnetic iron oxides containing cobalt, separating said oxides from said aqueous medium and, if necessary, heating the dried oxides in an oxidizing gaseous medium as for instance air, to a temperature not surpassing 500° C., preferably to 200–350° C. In carrying out this reaction the cobalt compounds are used in such quantities that the oxides obtained contain 1.5–4 atomic percent of cobalt.

Especially valuable oxides are obtained when using such conditions for the precipitation of the hydroxides, that the precipitated hydroxides contain 1–20, preferably 5–15 atomic percent of the iron in trivalent, the rest in divalent form.

As iron and cobalt salts for carrying out the above reaction there may be used inorganic as well as organic salts such as sulfates, chlorides, nitrates, acetates. The most suitable salts are the iron and cobalt sulfates. As cobalt salts there are preferably applied such salts in which the cobalt is divalent, although also salts of trivalent cobalt, such as cobalt-complex salts may be used, from the aqueous solutions of which cobalt hydroxides can be precipitated by means of hydroxides of alkaline metals.

For precipitating the hydroxides from the aqueous solutions of iron and cobalt salts there may be used the hydroxides of the alkaline and earth alkaline metals, such as sodium hydroxide, potassium hydroxide, calcium hydroxide, furthermore ammonia. The most suitable precipitating agents are the hydroxides of the alkaline metals.

The co-precipitation of the hydroxides is preferably carried out at temperatures of about 5–30° C., although also lower or higher temperatures may be used.

Suitable oxidizing agents for carrying out the above process are for instance nitrates, such as potassium-, sodium-, ammonium-nitrate, water soluble chlorates, such as sodium chlorate, persulfates such as potassium persulfate, $H_2O_2$, oxygen. The oxidation of the coprecipitated hydroxides is preferably carried out at elevated temperatures lying between about 50° C. and the boiling point of the solution. Temperatures of about 65–90° C. are most suitable.

The ferro-magnetic oxides obtained by treating the co-precipitated hydroxides in the aqueous medium most probably correspond to the formula FeO, $Fe_2O_3$ (magnetite) in which 1.5–4 atomic percent of iron are substituted by cobalt, whereas the oxides obtained by treating said compounds in an oxidizing gaseous medium most probably correspond to the formula $\gamma$-$Fe_2O_3$, in which 1.5–4 atomic percent of iron are substituted by cobalt.

Generally speaking the latter oxides are more suitable for the production of magnetic impulse record carriers than the magnetites in view of their higher remanence values and their better properties with regard to the printing-through effect. The oxides disclosed above are distinguished over the prior art ferromagnetic oxides by their valuable magnetic properties. In view of the fact that the remanence values of said oxides are at least 400 Gauss and their coercivity value between about 220 and 420 Oersted they are especially suitable for the production of magnetic impulse record carriers. In view of the high remanence values of said oxides the magnetic impulse record carriers produced therefrom are distinguished over the prior art carriers by a higher reproducing level. Moreover the oxides of the present invention consist of cubes which may be incorporated in comparatively high quantities into the magnetizable layers. The oxides of the prior art as for instance those obtained from $\alpha$-FeOOH and $\gamma$-FeOOH can only be incorporated in such quantities into the binding agents of the recording layer that these have a thickness of 14–16$\mu$ with a content of oxide of 20 g. per square meter; whereas with the present oxides the layer has only a thickness of 12–13$\mu$ at the same content of oxide per square meter. In view of this the layers of the present invention contain on the average 25 percent more of oxide than the layer of the prior art.

These carriers may be made by conventional methods. For instance, the magnetizable oxides may be finely dispersed in a coating composition such as a lacquer, and applied to the surface of a preferably non-magnetic supporting member, such as a wire, a disc, a fiber, a tape, a foil, by means of a fountain roll, by immersion, by casting, by spraying, by means of brushes or by any other convenient method. The coating composition contains a non-magnetic binder such as a cellulosic derivative, as for instance nitrocellulose, a high molecular polyamide, polymers and copolymers of acrylic acid and methacrylic acid, ethyl esters, such as methyl, ethyl butylesters, copolymers of vinylchloride and vinylacetate of any other synthetic thermoplastic film-forming plastics, or a gum or a natural resin. It is also possible to disperse the oxides in solutions of such compounds as are transformed into a film-forming binding agent after evaporation of the solvent. Such compounds are for instance the polyisocyanates and organic compounds that contain at least two reactive hydrogen atoms, such as polyhydric alcohols, or polyesters with hydroxyl end groups, which after evaporation of the solvent and if necessary after heating form a polyurethane. It is also possible to work up mixtures containing the oxides and a binding agent by calendering or extruding into foils or filaments. (For further details we refer to the book "German Plastics Practice," pages 481–488, by J. M. De Bell, W. C. Goggin, W. C. Gloor, published by De Bell and Richardson, Springfield, Massachusetts, 1946.) The magnetic layer may contain about two to three parts of ferromagnetic oxide to about one part of binding agent.

The invention is further illustrated by the following examples without being restricted thereto.

*Example 1*

To a solution of 7 mol NaOH and 0.04 mol $NaClO_3$ in 6 litres of water which is kept under nitrogen there is quickly added at room-temperature (22° C.) a solution of 2.895 mol of $FeSO_4 \cdot 7H_2O$ and 0.105 mol of $CoSO_4 \cdot 7H_2O$ in 3 litres of water. The precipitate of hydroxides formed contains 3 mols of metal atoms of which 3.5 atomic percent are cobalt and 8 atomic percent are trivalent iron. The suspension is heated under nitrogen to 80° C. and mixed with 1 mol of $NaNO_3$ in 0.3 litre water. The mixture is kept while stirring for 80 minutes at 80° C. and at last heated to the boil for 60 minutes. The precipitate is decanted four times with water, sucked off and dried at 100° C. The dried black precipitate is oxidized by heating it under a stream of air to 280° C. After 6 hours the black precipitate is transformed into a greyish brown oxide corresponding approximately to the formula $Me_2O_3$, in which M stands for iron and cobalt. This oxide has the following magnetic values: remanence=550 Gauss, coercive force=370 Oersted.

These values are found by the following method: The oxide powder is filled into a glass tube of 20 cm. length and 7 mm. inner width. This tube is magnetized in lengthwise direction until saturation is reached and the magnetization is measured after removal of the magnetizing source. The value found is divided by the specific weight in g./cm.$^3$ of the powder as present in the tube. The resultant value of remanence $B_R$ is therefore independent of the amount of iron oxide present in the tube. The coercive force $H_E$ is the magnetic force which is required to completely demagnetize the sample which had been magnetized beforehand to full saturation, that is to say the sample is completely unmagnetic after switching off the demagnetizing field.

For producing a magnetic tape from the above oxide a mixture of 300 grams of said oxide, 1200 grams of nitrocellulose, 453 cm.$^3$ of phthalic acid-di-n-butyl ester, 3500 cm.$^3$ of butyl acetate, 2500 cm.$^3$ of toluene and 200 cm.$^3$ of ethanol are given into a steel-ball mill and milled for 24 hours. Thereafter the mixture is coated in an ordinary coating machine having a doctor blade on a 45$\mu$ foil of cellulose acetate. After drying the coated layer has a thickness of 15$\mu$. The foil has a content of ferro-magnetic oxide of 25 gram per m.$^2$. The foil is cut into tapes of 6.3 mm. width. The maximum reproducing level at a harmonic distortion of 3% (third harmonic) of this tape was 45 percent higher than that of a tape which was produced in the same manner from a cobalt-free iron oxide obtained by the same process as disclosed above. As compared with tapes the iron oxide of which was produced from $\alpha$-FeOOH the reproducing level of the tape of the present invention was 50–55 percent higher.

These values were found in a tape recorder with a speed of 38 cm. per second. Each tape was recorded with an optimum bias with regard to the kilocycle/second-tone and the low frequency current was increased until at the reproduction of the tone a harmonic distortion (for the third harmonic) of 3% was obtained. The measured reproducing voltages which are proportional to the reproducing level, were compared with each other.

*Example 2*

A tape was produced according to the process disclosed in Example 1. The procedure for obtaining the ferro-magnetic oxide was the same as that disclosed in the preceding example with the exception that the solution of sodium hydroxide contained only 6.5 mol NaOH in 6 litres of water and that the aqueous solution of metal salts contained 2.73 mol of $FeSO_4 \cdot 7H_2O$, 0.09 mol of $Fe_2(SO_4)$ and 0.09 mol of $COSO_4 \cdot 7H_2O$. After the oxidation in the presence of air there was obtained a brown oxide having a remanence of 520 Gauss and a coercivity of 325 Oersted. The tape produced from said oxide had a magnetic coating of 15$\mu$ thickness containing 24 grams of metal oxide per m.$^2$. The recorded signal with just audible distortion was 35% higher than that of a corresponding tape without cobalt.

The magnetic values of the magnetic oxides used according to the present invention are essentially influenced by the amount of cobalt contained in said oxides. In the accompanying Figure 1 there are shown curves demonstrating the remanence and coercivity values of magnetic oxides obtained according to the process of Example 1 which oxides were produced with varying amounts of cobalt. Oxides with a content of 1% of cobalt have practically the same magnetic values as cobalt-free iron oxides. With a content of 1.5 percent of cobalt the remanence and coercivity values begin to increase very markedly and with 4 percent of cobalt a remanence of 600 Gauss is obtained. A further increase of cobalt does not result in an appreciable improvement of the magnetic values in view of the fact that with greater amounts of cobalt only remanence values not exceeding 700 Gauss can be obtained, as for instaince such amounting to 10 and 20 atoms percent.

As regards the coercivity values of the oxides these also increase very markedly with the increase of the cobalt content. With a content of 4 atomic percent of cobalt the coercivity amounts to 420 Oersted and with 10–20 percent of cobalt values of 1500 Oersted are obtained (not shown in the curves of Fig. 1). However, ferromagnetic oxides with high coercivity values are not suitable for the production of magnetic record carriers. It has been found that only ferromagnetic oxides with coercivity values not surpassing about 420 Gauss are suitable for use. Magnetic tapes with ferromagnetic oxides of higher coercivity values are only magnetized and erased with difficulty. These drawbacks are completely overcome with the ferromagnetic oxides of the present invention. Ferromagnetic iron oxides with a content of cobalt of about 3 to 4 atomic percent of cobalt have been found to be most suitable.

Figure 2:
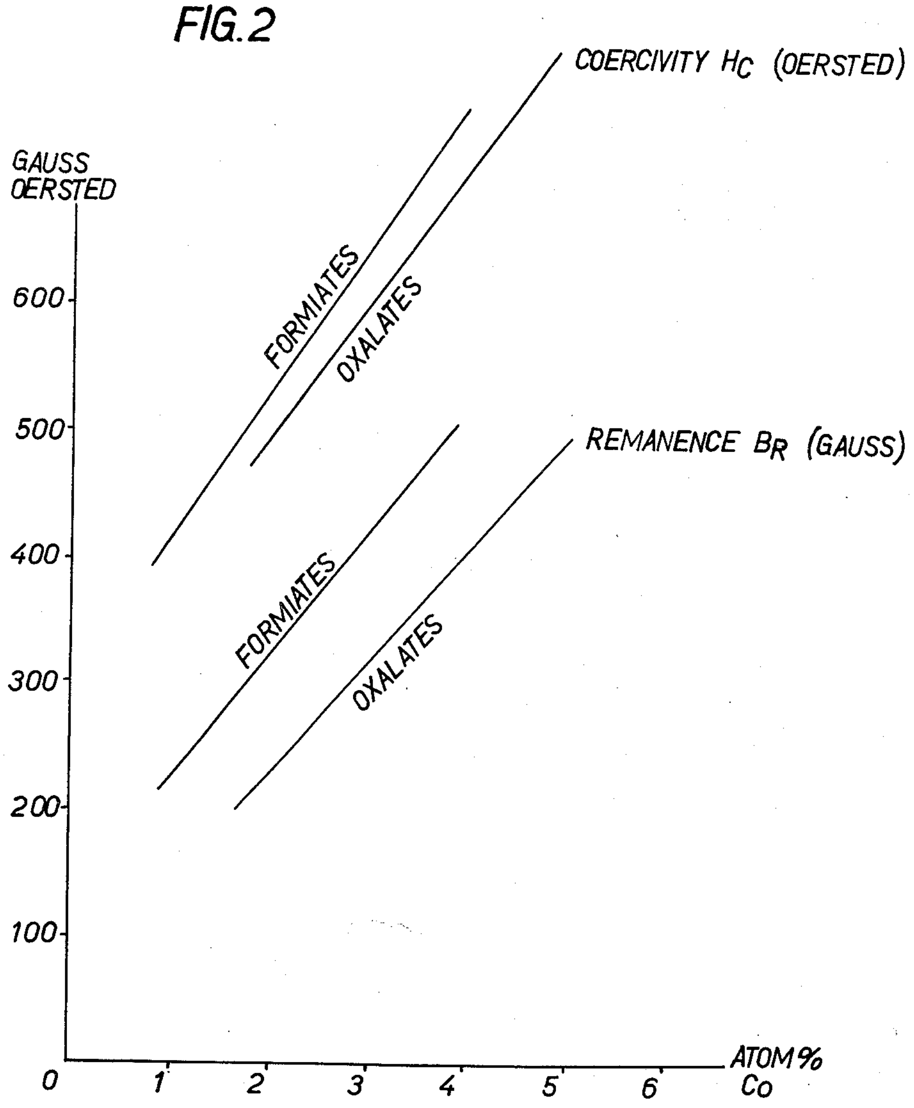

The progress which is achieved with the oxides of the present invention becomes still more evident from a comparison of these oxides with ferromagnetic cobalt-containing iron oxides which are obtained according to known methods by dry decomposition of metal salts of organic acids. These oxides were produced according to the process of United States specification 2,463,413 and British specification 596,875 from co-precipitated iron and cobalt formates or, iron and cobalt oxalates respectively by decomposing them at 400° C. in an inert atmosphere and thereafter oxidizing the decomposed products in a nitrogen-air mixture by heating to temperatures of 450° C. In the accompanying Figure 2 the magnetic values of such oxides which contain varying amounts of cobalt are represented. Oxides produced from formiates containing besides iron 1 atomic percent of cobalt have a remanence of 228 Gauss and a coercivity value of 407 Oersted. This remanence is essentially smaller than that of ordinary iron oxides whereas the coercivity is comparatively high. When the content of cobalt is increased the remanence values become also higher however the coercivity values are increased so markedly that the oxides cannot be used for magnetic tapes. The properties of the oxides produced from oxalates are very similar to those of the aforementioned oxides. The same holds true with regard to mixed oxides produced from co-precipitated sulfates (not represented in Figure 2). For these reasons these oxides have neither been proposed nor used as magnetizable materials for the production of carriers for magnetic recordings.

Figure 3:
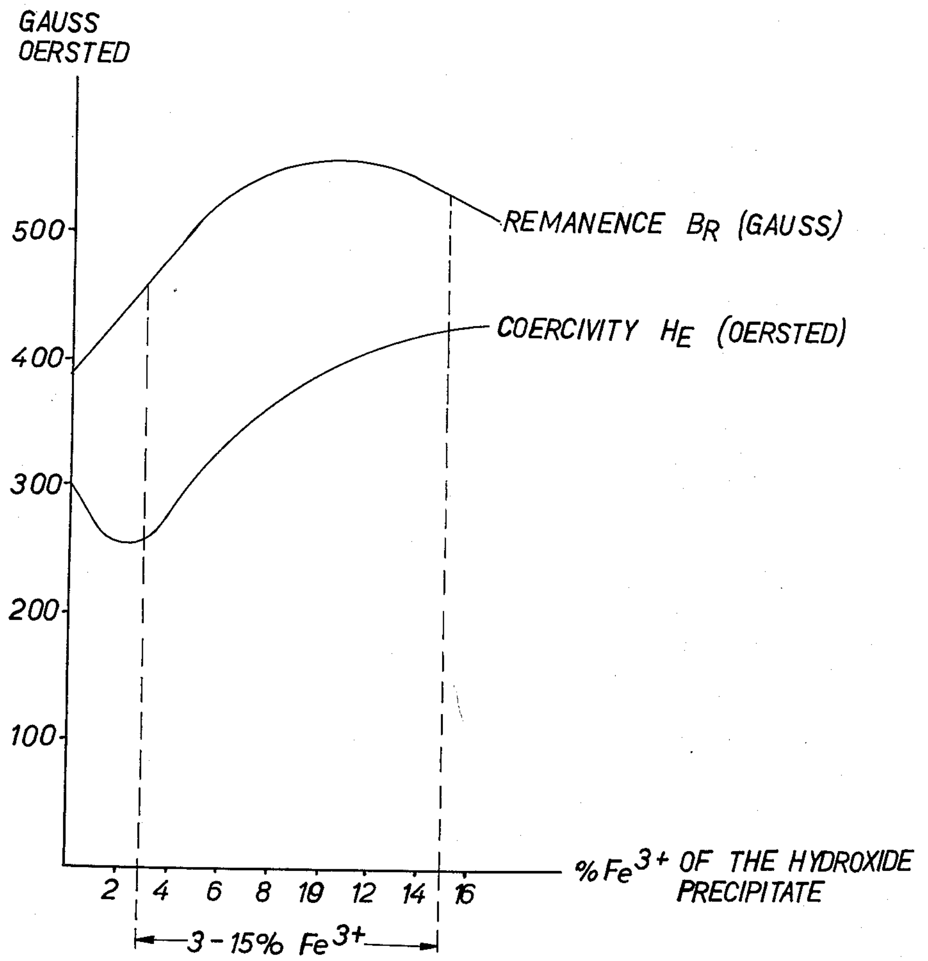

As pointed out above especially valuable ferromagnetic oxides are obtained when a hydroxide precipitate is used for the production of the present oxides which contains trivalent iron. It is less suitable to start with iron salt solutions in which the iron is exclusively present as a bivalent ion or in which 66 atomic percent of the iron are present as trivalent ions, so that no oxidation has to take place after precipitation of the hydroxides. The best magnetic values are obtained if the hydroxide precipitate contains 3–15 atomic percent of the iron as trivalent and the rest as bivalent ions. In the accompanying Figure 3 the magnetic values of oxides are represented which are obtained by the process of Example 1 when varying the content of trivalent iron ions in the hydroxide precipitate, which contain 3.5 atomic percent of cobalt. As illustrated by the curves of Figure 3 the remanence value of the oxide is comparatively low when using 0% of Fe (III) ions, whereas the coercivity value is comparatively high. When 3% of iron (III) are present in the hydroxide precipitate the remanence values begin to increase and reach a maximum with about 6–10 percent of Fe (III). With 10–15 percent of Fe (III) the remanence values begin to decrease but are still quite satisfactory.

In order to obtain hydroxide precipitates with the above amounts of iron (III) ions different methods may be applied. According to one method Fe (II) salts are used and precipitated with a solution of a hydroxide which contains an oxidizing agent as for instance sodium chlorate in such an amount as is necessary to form the required amount of Fe (III) hydroxide. Furthermore the hydroxide precipitate may be oxidized with appropriate amounts of oxidizing agents such as $H_2O_2$, $H_2S_2O_8O_2$, trivalent irons salts. According to a further method iron salt solutions may be used which contain before the precipitation of the hydroxides an appropriate amount for trivalent iron salts, as for instance 9.2 mols of $FeSO_4$ and 4 mols of $Fe_2(SO_4)_3$. Whichever methods may be applied, it is of advantage that the hydroxide precipitate contains about 3 to 15 atoms percent of trivalent iron, before oxidation to the magnetite takes place.

We claim:

1. A magnetic impulse record carrier consisting essentially of a layer of a non-magnetic binding agent having dispersed therein a powdery non-sintered ferromagnetic iron oxide, in which 1.5–4 atomic percent of iron are substituted by cobalt, said iron oxide being obtained by dissolving a water soluble salt of iron and a water soluble salt of cobalt in an aqeous solution the relative proportions of said salts being such that the cobalt metals amount to 1.5–4 atomic percent of the total amount of metals co-precipitating from said solution at a temperature within the range of about 5 to 30° C. the iron and cobalt ions as hydroxides, in which 3–15 atomic percent of the iron ions are present in trivalent, the rest in divalent form, treating said co-precipitated hydroxides in an aqeous medium with an alkaline agent in the presence of an oxiding agent at a temperature within the range of about 65 to 90° C., whereby said hydroxides are transformed into ferromagnetic oxides separating said oxides from said aqeous medium and drying said oxides.

2. A magnetic impulse record carrier consisting essentially of a layer of a non-magnetic binding agent having dispersed therein a powdery non-sintered ferromagnetic iron oxide, in which 1.5–4 atomic percent of iron are substituted by cobalt, said iron oxide being obtained by dissolving a water soluble salt of iron and a water soluble salt of cobalt in an aqeous solution the relative proportions of said salts being such that the cobalt metals amount to 1.5–4 atomic percent of the total amount of metals, co-precipitating from said solution at a temperature within the range of about 5 to 30° C. the iron and cobalt ions as hydroxides, in which 3–15 atomic percent of the iron ions are present in trivalent, the rest in divalent form, treating said co-precipitated hydroxides in an aqueous medium with an alkaline agent in the presence of an oxiding agent at a temperature within the range of about 65 to 90° C., whereby said hydroxides are transformed into ferromagnetic oxides separating said oxides from said aqeous medium and heating said oxides in an oxidizing gaseous medium to a temperature of 200–500° C.

References Cited in the file of this patent

UNITED STATES PATENTS

| | | |
|---|---|---|
| 2,463,413 | Neel | Mar. 1, 1949 |
| 2,582,590 | Heeren et al. | Jan. 15, 1952 |
| 2,654,681 | Lueck | Oct. 6, 1953 |
| 2,723,239 | Harvey | Nov. 8, 1955 |

FOREIGN PATENTS

| | | |
|---|---|---|
| 908,717 | France | Oct. 15, 1945 |
| 644,639 | Great Britain | Oct. 18, 1950 |
| 510,462 | Belgium | Apr. 30, 1952 |
| 891,625 | Germany | Oct. 1, 1953 |
| 717,269 | Great Britain | Oct. 27, 1954 |
| 721,630 | Great Britain | Jan. 12, 1955 |

OTHER REFERENCES

Bickford et al.: Physical Reviews, Aug. 15, 1955, p. 1213.

J. Institute of Electrical Engineers, Japan, June 1939, pp. 277, 278.

UNITED STATES PATENT OFFICE
CERTIFICATION OF CORRECTION

Patent No. 2,978,414 April 4, 1961

Rolf Brück et al.

It is hereby certified that error appears in the above numbered patent requiring correction and that the said Letters Patent should read as corrected below.

In the grant, lines 1 and 2, for " Walter Harz, of Hamburg, and Rolf Bruck, of Leverkusen-Bayerwerk, Germany," read -- Rolf Brück, of Leverkusen-Bayerwerk, and Walter Harz, of Hamburg, Germany, --; in the drawings, Sheets 1, 2 and 3, line 1 of the heading thereof, for "W. HARZ ET AL", each occurrence, read -- R. BRÜCK ET AL --; in the heading to the printed specification, lines 3 and 4, for "Walter Harz, Hamburg, and Rolf Bruck, Leverkusen-Bayerwerk, Germany," read -- Rolf Brück, Leverkusen-Bayerwerk, and Walter Harz, Hamburg, Germany, --; column 3, line 31, before "water" insert -- of --; column 4, line 41, for "instaince" read -- instance --; line 68, for "formates" read -- formiates --; column 6, line 8, after "metals" insert a comma; lines 24 and 36, for "aqeous", each occurrence, read -- aqueous --.

Signed and sealed this 26th day of September 1961.

(SEAL)
Attest:

ERNEST W. SWIDER
Attesting Officer

DAVID L. LADD
Commissioner of Patents